United States Patent [19]

Elton et al.

[11] 4,416,727

[45] Nov. 22, 1983

[54] PROCESS FOR RECOVERING FIBER FROM WET-STRENGTH RESIN COATED PAPER

[75] Inventors: Edward F. Elton, Whitehall; Vincent L. Magnotta, Coopersburg, both of Pa.

[73] Assignee: Air Products and Chemicals, Inc., Allentown, Pa.

[21] Appl. No.: 338,773

[22] Filed: Jan. 11, 1982

[51] Int. Cl.$^3$ .............................................. D21C 5/02
[52] U.S. Cl. ........................................ 162/6; 162/8; 162/65; 162/191
[58] Field of Search ................ 162/8, 65, 6, 55, 60, 162/191

[56] References Cited

U.S. PATENT DOCUMENTS

| | | | |
|---|---|---|---|
| 1,245,839 | 11/1917 | Waring et al. | |
| 2,042,465 | 6/1936 | Hines | |
| 2,872,313 | 2/1959 | House et al. | |
| 3,245,868 | 4/1966 | Espenmiller et al. | 162/8 |
| 3,262,838 | 7/1966 | Vieth et al. | 162/8 |
| 3,345,318 | 10/1967 | Lindemann et al. | |
| 3,380,851 | 4/1968 | Lindemann et al. | |
| 3,407,113 | 10/1968 | Maxwell | 162/6 |
| 3,425,897 | 2/1969 | Murphy, Jr. | 162/8 |
| 3,438,851 | 4/1969 | Schoubers et al. | 162/5 |
| 3,759,783 | 9/1973 | Samuelson et al. | 162/65 |
| 3,816,238 | 6/1974 | Mitchell | 162/8 |
| 3,873,411 | 3/1975 | Drelich et al. | 162/8 |
| 3,933,578 | 1/1976 | Kasugai et al. | 162/5 |
| 4,220,498 | 9/1980 | Prough | 162/65 |

OTHER PUBLICATIONS

*Adhesives Age,* 10/78, pp. 27–30.
"*Paper Recycling and the Use of Chemicals* 1971" Noyes Data Corp., Noyes Building, Park Ridge, New Jersey 07656.

*Primary Examiner*—William F. Smith
*Attorney, Agent, or Firm*—Geoffrey L. Chase; E. Eugene Innis; James C. Simmons

[57] ABSTRACT

A process is set forth for the recovery of fiber from paper waste and paper broke which paper has been treated with wet-strength resins. The process involves shredding the paper to be recovered and then subjecting the shredded paper to an alkaline solution and an oxygen containing atmosphere to liberate the paper fiber from the resin with retention of the paper fiber brightness. The liberated fiber can then be recycled through the paper web forming process. The process is particularly appropriate to the removal of thermoplastic resins from paper.

11 Claims, 3 Drawing Figures

PROCESS FOR RECOVERING FIBER FROM WET-STRENGTH RESIN COATED PAPER

TECHNICAL FIELD

The present invention relates to a process for the recovery of fiber from waste paper and paper broke which has been treated with wet-strength resins, such as in the production of paper towels. Specifically the present invention is directed to the removal of such resins, particularly thermoplastic resins, from the fiber material so that such fiber material may be recycled to a paper web forming process.

BACKGROUND OF THE PRIOR ART

The use of paper under conditions in which the paper must be used in the wet state or to absorb moisture has become one of the major utilities of paper products. Paper normally achieves its integrity or fiber to fiber strength by bonding between the fibers, possibly hydrogen bonding of the various molecular components of the fiber. Such fiber to fiber bonding provides adequate strength for papers used in the dry condition, such as writing or printing papers or packaging which is not subjected to outdoor atmospheric conditions. However, with the advent of disposable towels prepared from paper, disposable paper diapers and the need for packaging which maintains its strength under moisture conditions such as outdoor or atmospheric applications, it has become necessary to provide additional bonding for these paper products in order to maintain what is called wet-strength. Wet-strength is developed in paper products by various coating methods which provide continuous or discrete depositions of polymeric resins which effectively bond portions of the paper product. Such wet-strength resin coated paper products are necessary for manufacture of disposable paper kitchen towels and disposable baby diapers. Other uses of wet-strength papers are readily known in the prior art.

Prior to the advent of wet-strength resin coated paper products, recycled paper, waste paper, clippings, and paper broke were easily recycled to the paper forming processes of paper mills by various mild digestions of the recycled paper before being returned to the paper furnish. Even the use of water soluble resins for paper coating provided no problem for those interested in recycling the various paper wastes.

However, the wet-strength resins have provided difficult problems for the reuse of waste paper, such that such waste paper in many instances is burned or landfilled rather than subject the paper to expensive or poor yield cleansing processes.

A process for recycling printed paper to a useable pulp is described in U.S. Pat. No. 1,245,839. The invention is specifically concerned with the removal of ink and other printed coloring matter from paper. The paper is subjected to an aqueous soap solution which saponifies the oil or fatty portions of the ink. Air is used to separate the ink and carbon pigment from the paper by froth flotation. Ozone or other gases can be used to bleach the pulp. However this patent is not concerned with the removal of polymer or resin coatings from paper.

In U.S. Pat. No. 2,042,465, the problem of de-inking uncoated waste paper is again addressed. A caustic soda or soapy solution is used to slurry the paper to a pulp, while air is passed up through the pulp to oxygenate the oil phase of the ink. The oxidized ink is then separated from the pulp. Again, this reference does not concern removal of wet-strength resins.

In U.S. Pat. No. 2,872,313 a process for defibering wet-strength paper broke is set forth in which oxidizing salts in a dilute aqueous solution are utilized to loosen the fiber to resin bonds. The paper broke is soaked in the oxidizing solution with preferably mild agitation. The oxidizing salt agents can be selected from sodium hypochlorite, sodium chlorite, sodium chlorate, potassium chlorate, ammonium persulfate and sodium peroxide. The solution utilized generally has a pH between 7 and 10. Elevated temperatures may be utilized in the range of 115° to 180° F.

The removal of thermosetting wet-strength resins from paper is addressed in U.S. Pat. No. 3,245,868. Inclined screw fed vessels are used to handle the pulp. The resin can be removed by either acidic solutions for formaldehyde resins or basic solutions (caustic soda) for removing polyamide resins. Temperatures as high as 149° C. are contemplated, but the patent does not direct itself to paper brightness enhancement. Additionally, the patent contemplates caustic strengths to dry fiber pulp of only 4%.

U.S. Pat. No. 3,427,217 discloses a recycle process for wet-strength resin coated broke wherein an oxidizing salt such as sodium hypochlorite is used to facilitate the pulping of the coated paper. Sodium hydroxide can be used to provide a basic solution.

Additional references which are directed to broke recovery are: U.S. Pat. Nos. 3,407,113, 3,425,897, 3,438,851; and 3,933,578.

BRIEF SUMMARY OF THE INVENTION

The present invention comprises a process for the recovery of fibers, particularly cellulose fibers, from waste paper, paper trimmings and paper broke which have previously been treated with a wet-strength resin, such as vinyl acetate-ethylene-N-methylol acrylamide. The fiber recovery process consists of shredding the paper waste or paper broke material to a comminuted form, preferably 2 to 4 inches square, subjecting the comminuted paper stock or paper broke to an alkaline solution to provide a pulp consisting of 10% to 25%, contacting the pulp with an oxygen atmosphere at relatively high temperatures in order to free the individual fibers from the wet-strength coating such that the brightness of the fibers is maintained, diluting the individually separated fibers to a consistency of 2% to 8% and screening the separated fibers in order to recover the individual fibers from non-screenable materials. The screened and separated fibers can then be recycled to a paper furnish for the production of paper sheets, or other paper products.

In this manner, wet-strength paper production processes can utilize substantially more of the total fiber content of paper formed in the paper furnish by recovering the paper broke without resort to the prior art practice of burning or disposing of the valuable paper fiber content of the broke which is normally a by-product of wet-strength paper production processes.

It is an object of the present invention to perform such a recovery process on paper fibers wherein an alkali charge of from 3 to 17% is utilized in the process, more preferably 4 to 15%.

It is another object of the present invention to utilize a pressurized oxygen atmosphere having an oxygen partial pressure of preferably from 10 to 90 psi, more preferably 30–60 psi, in the recovery process to maintain brightness and improve fiber liberation from wet-strength resins.

It is a further object of the present invention to perform such an alkali-oxygen broke recovery at a temperature of from 70° to 170° C., preferably 90° to 150° C., most preferably 110° to 140° C.

It is an object of the present invention to process paper broke at a consistency of 1% to 30%, preferably 10% to 25%, by the method of the present invention.

DETAILED DESCRIPTION OF THE INVENTION

Figure 1:
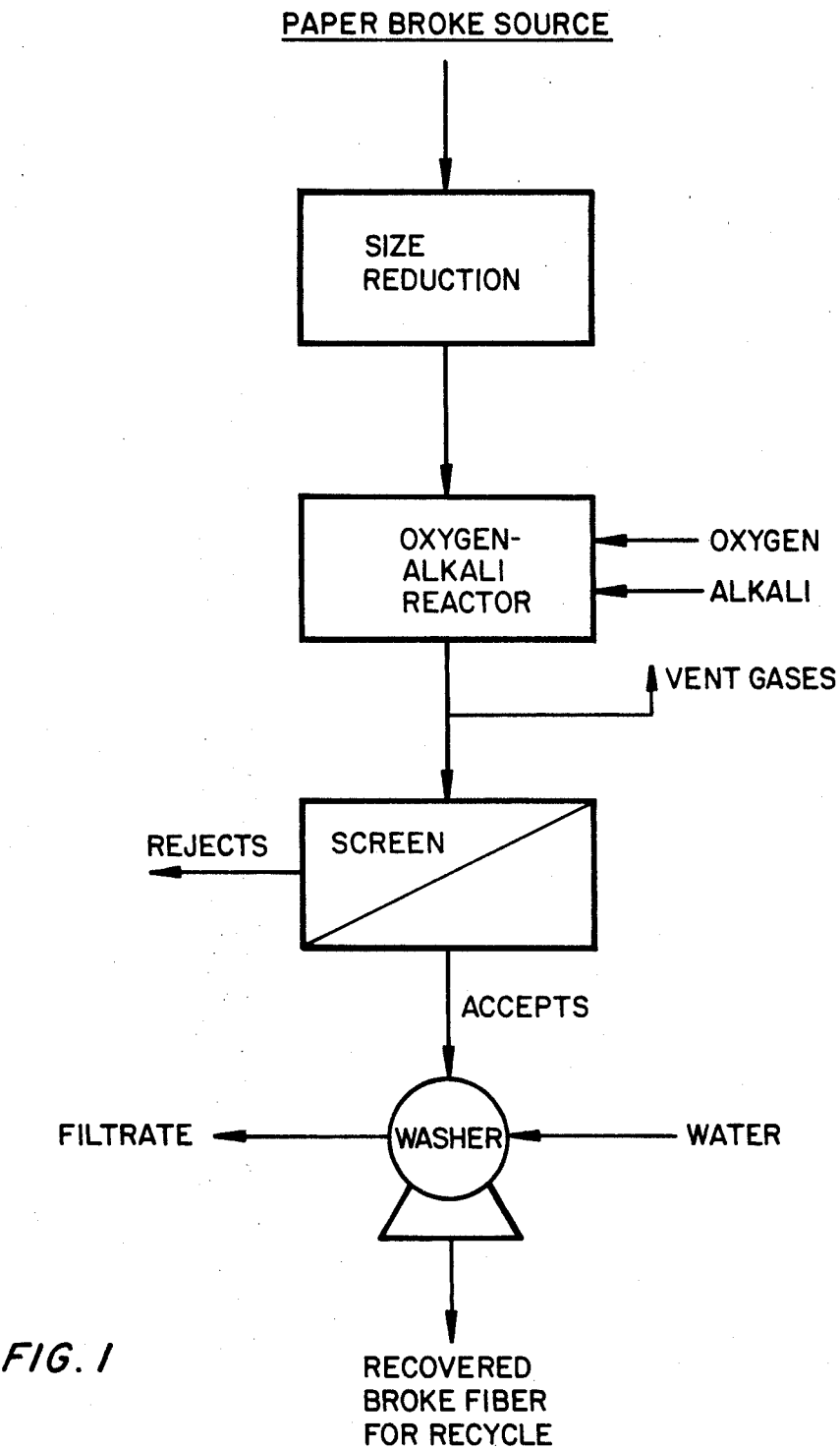
FIG. 1 shows a flow scheme for a general embodiment of the broke recovery process of the present invention.

The process of the present invention is broadly shown in FIG. 1. The production of wet-strength resin coated papers such as diapers, towels and weather resistant packaging material constitutes a greater and greater percentage of the present day paper production. In the past, strength imparting coatings have been applied to paper products, which coatings were easily hydrolyzed or dissolved. With the improvement of wet-strength paper products wherein polymeric resins are used as binders for the paper products, a substantial loss in paper fiber is realized due to the inability to reprocess waste paper or paper broke. Paper broke is that fraction of the paper product of a paper production which is rejected for any one of a number of reasons, such as crushed, damaged, or wrinkled paper, trim from a paper roll or other rejected paper occuring during the paper production process.

This paper broke constitutes a substantial portion of the total paper fiber processed in paper production, sometimes 20% of the paper processed. Such paper broke was easily recycled when binders were not used or the binders were easily dealt with. However, with the use of polymeric resins as binders especially cross-linked resins, the ability to produce recyclable paper fiber from paper broke has been curtailed. The broke from wet-strength resin coated papers has in many instances been land filled or burned due to the inability to economically recycle the fiber content.

The present invention overcomes this inability and is effective on previously difficult polymeric resin coatings on paper broke. The process utilizes a combination of alkaline solution, high temperature, gentle agitation and oxyen under a pressurized condition. The process is deemed to be effective on most wet-strength resins, but it has particular utility in the removal of thermoplastic resins such as vinyl acetate-ethylene copolymer which is cross-linked with N-methylol acrylamide as described in U.S. Pat. Nos. 3,345,318 and 3,380,851. The process of the present broke recovery from wet-strength binders is achieved by treating the broke material in a shredded condition in the presence of oxygen and alkali at elevated temperatures. The product can then be screened in order to extract acceptable fibers called accepts from unacceptable fiber and extraneous material which are called rejects. Potentially, the rejects can be recycled in a further attempt to extract usable fiber content therefrom, but the invention also contemplates the disposal of this minor amount of fiber and other materials.

As shown in FIG. 1, the wet-strength resin coated paper broke is first reduced in size by processing in a size reduction paper shredder. The shredder reduces the paper broke to a size which is preferably 2 to 4 inches square, but any size of paper reduction can be performed which is consistent with the downstream processing equipment for the recovery of the paper fiber from the broke. The shredded paper is then transported to a reactor where oxygen and alkali, such as sodium hydroxide, are intermixed with the paper material with agitation at elevated temperatures. Other alkaline materials may be utilized in the reaction vessel including sodium borate, sodium carbonate, sodium bicarbonate and other alkali metal hydroxides. The temperature of the reactor may be maintained in the range of 70° to 170° C. Preferably, the temperature will be maintained at a range of 90° to 150° C. Still more preferably the range should be 110° to 140°. The alkali is added as an aqueous solution to the reaction vessel. An alkaline charge of from 3 to 17% as a weight fraction of bone dry fiber can be utilized. However, the preferred range of alkaline charge is from 4 to 15%. The reaction time will vary depending on the wet strength resin and the alkali charge, but the reaction time can be operable from between 1 minute of contact time to 120 minutes of contact time. Preferably, the reaction time should be in the range of 5 to 30 minutes. The partial pressure of oxygen which is supplied to the reaction vessel should preferably be within a range of 10 to 90 psi, but more preferably the oxygen partial pressure will be within the range of 30 to 60 psi. Within the preferred range of temperature and $O_2$ partial pressure the reactor pressure would be 25 psig at a temperature of 90° C. and an $O_2$ partial pressure of 30 psi, while the reactor pressure would be 114 psig at the upper range of temperature at 150° C. and $O_2$ partial pressure of 60 psi. The reactor, which will be purged of other atmospheres, will have a partial pressure of water vapor which value will be temperature dependant. The pulp is treated at a consistency in an aqueous mixture or slurry wherein consistency is measured as the weight fraction of dry fiber in the slurry at a range of 1 to 30%, but preferably 10 to 25%. Optionally, the reaction mixture may contain a magnesium ion charge of from 0.05 to 0.3% as a weight fraction based upon bone dry fiber. The magnesium ion is deemed to be helpful in maintaining physical strength of processed fiber.

Returning to FIG. 1, the paper broke having been processed in the alkali-oxygen reactor is then conveyed to a screening station. During this conveyance, volatile materials such as gases are vented from the paper slurry. In addition, water is added to the paper slurry in order to provide a screenable feed. The consistency for screening should be approximately 3%. The separated fibers pass through the screening means and are recyclable after being washed with an aqueous feed on a cylindrical drum washer. Rejects which do not pass through the screening means and consist of agglomerated fibers and any solid foreign material are removed for disposal or burning. Optionally, the rejects can be recycled to the upstream portion of the alkali-oxygen reactor for further treatment in attempting to separate the fiber constituents of the rejects. Dissolved polymer components are removed from the acceptable fibers during the course of the washing cycle. This dissolved material is not reclaimed. The washed accept separated fibers are then in a condition to be utilized for paper production, and they can be recycled to the production process in which they originally formed the broke. In this manner, the fraction of paper production which becomes broke, and which has been known to be as high as 20% of paper production, is effectively reintroduced into the system and fiber losses are therefore greatly minimized.

The following examples are exemplary of the invention but should not in any way be construed to be a limitation of the process practiced and described herein.

EXAMPLE 1

To demonstrate the effect of alkali used alone in the processing of wet-strength resin coated paper broke, a 25 gram sample of towel containing 26% by weight of vinyl acetate-ethylene copolymer cross-linked with N-methylol acrylamide commonly known as AIRFLEX TM binder was shredded into 2 to 4 inch$^2$ pieces. This material was dispersed in water using a British Disintegrator followed by dewatering to 15% consistency. Sodium hydroxide was added in an amount equivalent to 17% of the dry towel weight. This slurry was processed for 40 minutes at 150° C. in an autoclave after the reactor was purged with nitrogen. The reactor pressure was 54 psig with no oxygen partial pressure. The reactor product was diluted to 1.2% consistency and screened on a vibrating flat screen containing 0.01 inch slots. The accepts collected on a 200 mesh box screen were formed into hand sheets for testing. The hand sheets had a brightness of 61% and contained 10% by weight binder as determined by thermogravemetric analysis. The initial feed brightness was 76%. This example shows that an alkali charge alone affects a significant brightness drop in processed broke.

EXAMPLE 2

The same feed material and conditions used in Example 1 were used in this experiment except that an oxygen partial pressure of 110 psig was imposed on the high temperature processing after an oxygen purge. The reactor pressure was 164 psig. The resulting hand sheets had a brightness of 80% and a residual binder content of 9%. Note, the effect of oxygen caused a net increase in material brightness relative to the significant brightness decrease observed in Example 1. The combination of alkali and oxygen provide improved brightness.

In the following Examples 3-7, a 25 gram sample of towel containing 10% Airflex binder was used. The same pretreatment and post treatment methods prior to the high temperature processing were used and were identical to that of Example 1. Additionally, the following conditions were held constant for Examples 3-7: the reaction time was maintained at 40 minutes; and the reaction pressure was maintained at 125 psig by oxygen gas. The partial pressure of oxygen was varied with respect to the temperature in each example as noted due to the increase in water vapor pressure.

EXAMPLE 3

An amount of sodium hydroxide equivalent to 7% of the dry fiber weight was used in this example. The reactor temperature was 100° C. and the paper fiber consistency was 15%. The oxygen partial pressure was 125 psi. The result of this example was a total yield of fiber of 96% of the starting material weight. However, the screening accepts amounted to only 28.5% of the starting material weight. This example shows that low temperature and low alkali charge even in the presence of oxygen does not remove the wet-strength resin adequately.

EXAMPLE 4

In this example the amount of sodium hydroxide utilized for the reaction was 12% by weight. The reaction temperature was 140° C. and the consistency of the paper feed was 20%. The oxygen partial pressure was 88 psi. Magnesium sulfate was added to the reaction mixture in an amount equivalent to 0.15% $Mg^{2+}$ based on the dry feed weight. The total yield of fiber from the reactor was 90.5% and the screen accepts weighed 85.5% of the reactor feed. This example shows optimal yield recovery conditions but does not measure brightness.

EXAMPLE 5

A paper feed of 22.5% consistency was utilized wherein the alkali charge consisted of 15%. All other conditions were identical to those of Example 4 including an oxygen partial pressure of 88 psi. The resulting total fiber yield was 80.3% and the screened yield was 70.1%. This example shows that increasing consistency and the alkali charge above that of Example 4 decreased yield.

EXAMPLE 6

In this experiment, a paper feed consistency of 15% was used at a temperature of 150° C. The oxygen partial pressure was 71 psi. The alkali charge of sodium hydroxide was 14%. Additionally, magnesium sulfate was added to the reaction mixture as in Example 4. The total yield of fiber was 86.2% and the screened yield was 75.4%. This example shows good yields in a reaction varying the conditions slightly from the optimal.

EXAMPLE 7

In this experiment the nondetrimental use of recycled dissolved solids in aqueous solution is shown. The experiment utilized the same conditions as Example 4, including an oxygen partial pressure of 88 psi, except that 41% of the dissolved solids from Example 4 spent liquor were added to the feed dilution water. The subsequent reaction resulted in a total yield of 87.5% and a screened yield of 73.9%. This example shows that recycling waste liquor allows for acceptable yield results.

In the ensuing examples the following conditions were held constant: (a) The pulp consistency was maintained at 20%; (b) the pulp brightness was measured on a Gardner PC5500 instrument calibrated with a magnesium oxide standard at 87.4% brightness. Pretreatment and postreatment of the paper broke was the same as the former examples.

EXAMPLE 8

Several runs of the broke recovery process were performed to show the effect of temperature on alkali treatment alone of the broke paper. The oxygen partial pressure was zero. The reaction times were maintained at 40 minutes and the alkali charge was 9% based on the feed weight. A first run was performed at 80° C. This run produced a total yield of 96.0% and an accepts yield of paper fibers at 59.5% and a brightness of 82.2% in comparison to a feed determined brightness of 83.6%. A second run was made at a temperature of 140° C. This run produced a total yield of 85.9% and accepts fiber yield of 83.9%. However, the brightness of this high temperature high yield run suffered and was determed to be 64.3% on a feed calculated at 83.6% brightness. This indicates that a high temperature processing of the broke for yield of separated fiber recovery is benefited by reasonably high temperatures, but the fibers are affected with regard to their brightness. This is in the absence of oxygen.

EXAMPLE 9

In this example the effects of oxygen by itself on the recovery of fiber from wet-strength resin coated broke was studied. Oxygen by itself was contacted with a pulp charge without any caustic addition. This reaction was conducted at 140° C. and for a 40 minute duration. The partial pressure of oxygen was maintained at 87 psia. The reactor pressure was 124 psig. The resulting product had a brightness of 82.1% but achieved only a 53.4% screened yield although having a total yield of 98.4%. Thus, the use of oxygen alone at this temperature is only moderately effective for fiber recovery but does not decrease the brightness of the feed material significantly, as occurred using alkali alone in the reaction.

EXAMPLE 10

Figure 3:
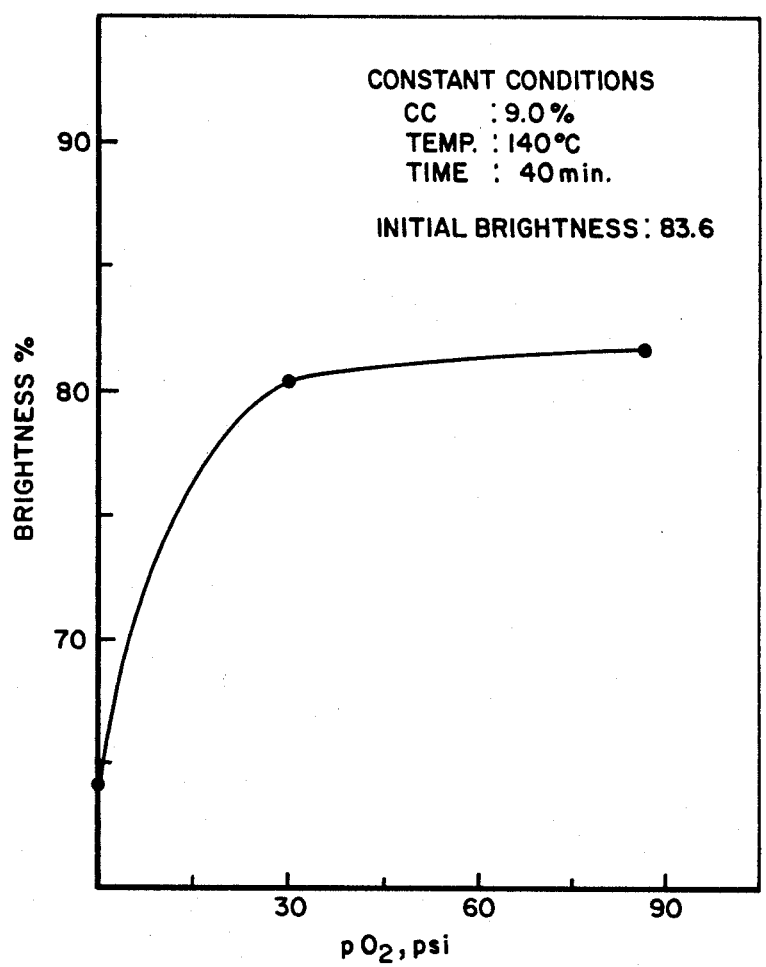
FIG. 3 is a graph of measured pulp brightness as a function of oxygen partial pressure.

In this experiment the effect of oxygen on the alkaline environment of the fiber recovery reaction was studied. Each run was conducted for 40 minutes at a caustic charge of 9% and a temperature of 140° C. In the first run an oxygen atmosphere was excluded from the reaction zone. The reactor pressure was 37 psig. Screened yields for the broke recovery in the absence of oxygen was 84%. The brightness was only 65%. The total yield was 85.9%. In the second run the reaction was conducted in an atmosphere having an oxygen partial pressure of 30 psi. The reactor pressure was 67 psig. This resulted in a screened yield of 81% and a dramatic increase in brightness values over the previous run of 81%. The total yield was 82.4%. A final run was conducted utilizing an oxygen partial pressure of 87 psi in which case the screened yield was 77% and the brightness was 82%. The total yield was 87%. The reactor pressure was 124 psig. This data tends to show that there is an oxygen partial pressure which provides an optimal increase in brightness at the cost of a minimal reduction in overall screened yield. The increase in oxygen partial pressure beyond 30 psi, particularly 60 psi, results in minimal brightness gained for a continued yield loss. This is exemplified in FIG. 3 where it is shown that the curve of brightness versus oxygen partial pressure levels off beyond the range of 30–60 psi. As illustrated by several of the previous examples, the process is operable for oxygen partial pressures in excess of 90 psi. However, higher pressures reduce selectivity and increase equipment costs.

Figure 2:
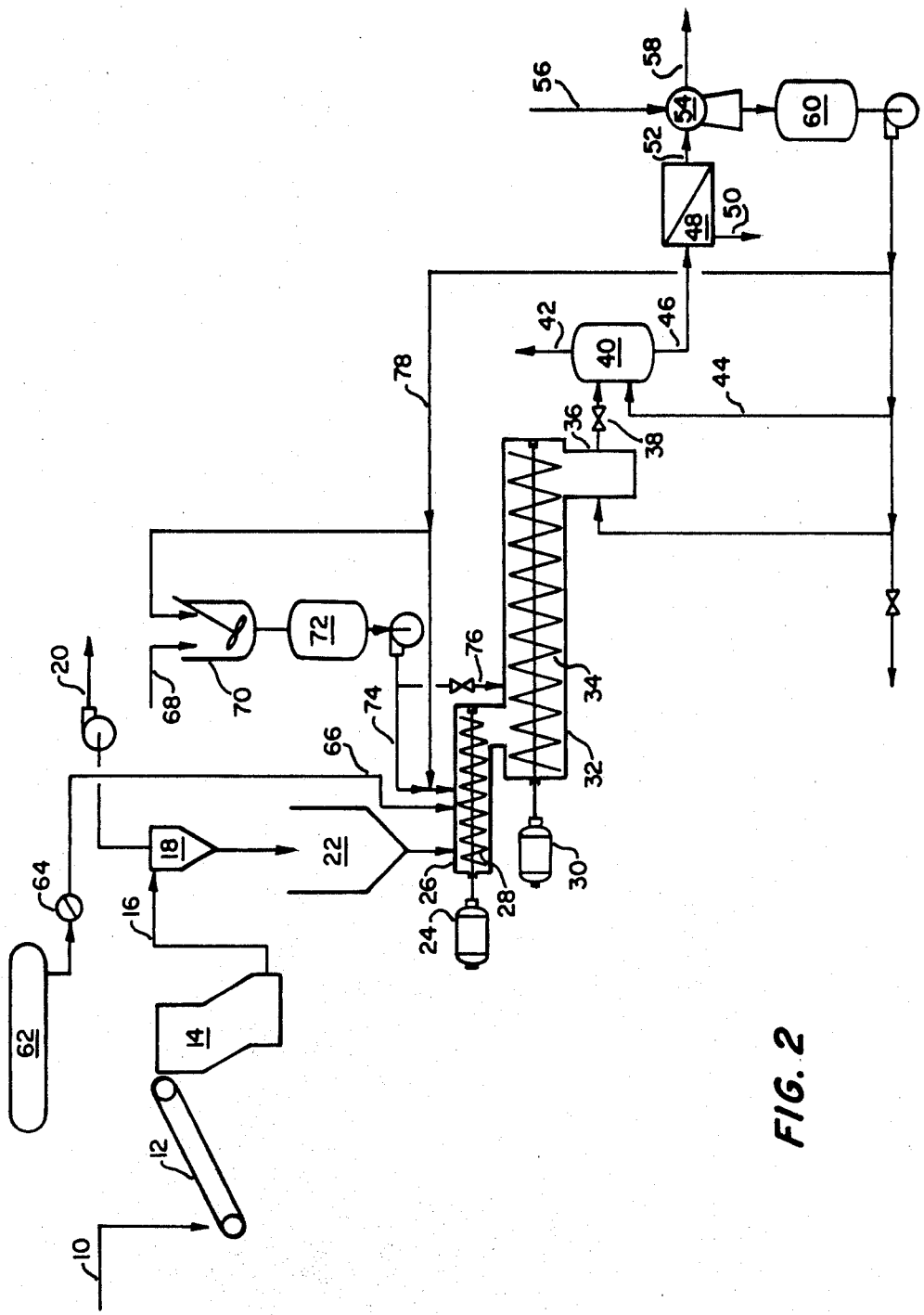
FIG. 2 shows a flow scheme for a detailed preferred embodiment of the broke recovery process of the present invention.

In FIG. 2, a preferred embodiment of the process of the present invention is shown. Paper broke is supplied from any source of trim waste or damaged wet-strength resin coated paper in the form of broke as indicated at point 10 in FIG. 2. The paper broke is conveyed by any means of conveyance such as a conveyor belt 12. The broke which may be in any dimension or size is then shredded into substantially uniform sized pieces by the shredder 14. The shredded broke is conveyed through conduit 16 to a separator such as a cyclone separator 18 to remove dust particles from the paper broke. The dust is vented through exhaust fan 20. The now dust free shredded paper broke is delivered to a storage silo 22. From this silo, paper broke is dispensed into an initial mixing reactor 26. The mixing reactor 26 constitutes a horizontal tubular reaction zone which is supplied with a screw conveyor 28 which is rotated by the means of an electric motor 24. The paper broke is conveyed along this reactor at a depth of about one-half the diameter of the reactor walls. At this point pressurized oxygen and an aqueous solution of caustic, such as sodium hydroxide, are supplied to the reactor and are blended with the paper broke to form a slurry by means of the conveyor agitator 28. The premixed slurry is then transferred to another horizontal tubular reactor 32 which in turn is mildly agitated by a screw conveyor 34 and powered by an electric motor 30. Both screw conveyors 28 and 34 are operated to provide a set reaction time, such as 40 minutes. The processed broke slurry is dispensed to a blow chamber 36 and metered through a pressure drop orifice 38 into a blow tank 40. Gases and vapors are vented from the slurry in vent 42. The slurry at ambient pressure conditions in blow tank 40 is then reduced in consistency by the addition of liquid from supply line 44. Gases are vented through line 42. The low consistency slurry is screened in screen chamber 48. Unscreenable rejects are dispensed with in outlet 50. Optionally, screen rejects can be recycled to point 10. Screened acceptable fibers are delivered to a washer 54 by conduit 52. Additional water is supplied and the washed pulp is available for recycling to paper production, while the dissolved solids and polymers are removed in a filtrate line to a filtrate storage container 60. This filtrate may be either partially recycled through the reaction process or removed as an effluent.

This constitutes a preferred embodiment for the paper broke recovery process of the present invention. The process is exemplified by this embodiment, but the scope of the invention should be determined by the several claims which follow:

We claim:

1. A process for recovering and maintaining the brightness of fibers from a wet-strength resin coated paper waste or broke comprising the steps of:
   (a) shredding the paper waste or broke to a comminuted form;
   (b) subjecting the comminuted paper waste or broke to an alkaline solution to provide a pulp slurry and contacting the pulp with an oxyen atmosphere at elevated temperatures to free individual fibers from the resin and to maintain the brightness of said fibers and residual resin;
   (c) diluting the separated fibers to a screenable consistency and screening the same to remove rejects; and
   (d) recovering a screened fiber pulp for use in paper production.

2. The process of claim 1 wherein the alkaline solution has an alkali charge of from 3 to 17%.

3. The process of claim 1 wherein the oxygen atmosphere is at a partial pressure of from 10 to 90 psi.

4. The process of claim 1 wherein the elevated temperature is from 70° to 170° C.

5. The process of claim 1 wherein the paper stock or broke is subjected to the alkaline-oxygen treatment for 5 to 120 minutes.

6. The process of claim 1 wherein the alkaline solution contains from 0.05 to 0.3% magnesium ion charge by the addition of magnesium sulfate to said solution.

7. The process of claim 1 wherein the comminuted paper waste is subjected to mild agitation during its contact with the alkaline solution and oxygen.

8. The process of claim 1 wherein the fiber rejects which are removed from the pulp during screening are recycled through the process in order to recover additional fiber value.

9. A process for recovering and maintaining the brightness of fibers from a wet-strength resin coated paper waste or paper broke comprising the steps of:

(a) shredding the paper waste or broke to a 2 to 4 square inch comminuted form;

(b) subjecting the comminuted paper waste or broke to an alkaline solution charge of 4% to 15% to provide a pulp slurry of 10% to 25% consistency and contacting the pulp slurry with oxygen at a partial pressure of 30 to 60 psi at a temperature of 110° to 140° C. with mild agitation to free the paper fibers from the resin and to maintain the brightness of said fibers and residual resin to at least 80% brightness;

(c) diluting the separated fibers to a 2% to 8% consistency and screening the same to remove rejects; and (d) recovering a screened pulp fiber free of resin for reuse in paper production.

10. The process of claim 9 wherein the fiber rejects which are removed from the pulp during screening are recycled through the process in order to recover additional fiber value.

11. The process of claim 1 wherein the temperature is maintained in the range of 110° to 140° C.

* * * * *